United States Patent [19]

Fain

[11] Patent Number: 4,820,664
[45] Date of Patent: Apr. 11, 1989

[54] PIGGY BACK METHOD FOR PRODUCING CERAMIC FIBERS AND NON-CIRCULAR CERAMIC FIBERS IN PARTICULAR

[75] Inventor: Charles C. Fain, Clemson, S.C.

[73] Assignee: Clemson University, Clemson, S.C.

[21] Appl. No.: 4,617

[22] Filed: Jan. 20, 1987

[51] Int. Cl.$^4$ .................. C04B 35/02; D02G 3/00
[52] U.S. Cl. .................. 501/95; 264/DIG. 19; 428/373; 428/375; 428/376; 428/396
[58] Field of Search .................. 501/95; 428/373, 375, 428/376, 396; 264/DIG. 19

[56] References Cited

U.S. PATENT DOCUMENTS

| | | | |
|---|---|---|---|
| 3,082,099 | 3/1963 | Beasley et al. | 264/DIG. 19 |
| 3,565,749 | 2/1971 | Wizon | 264/DIG. 19 |
| 4,214,037 | 7/1980 | Galasso et al. | 428/367 |
| 4,284,664 | 8/1981 | Rauch, Sr. | 427/180 |
| 4,488,920 | 12/1984 | Danis | 427/249 |
| 4,559,191 | 12/1985 | Arons | 264/DIG. 19 |

FOREIGN PATENT DOCUMENTS 0195353 1/1986 European Pat. Off. .

OTHER PUBLICATIONS

Buckley et al, *Chemical Engineering Progress*, "The Development of Biocomponent Fibers," Oct. 1969, pp. 41–45.

Sakka (American Ceramic Society Bulletin, vol. 64, No. 11, "Sol–Gel Synthesis of Glasses: Present and Future", (Nov. 1985).

*Primary Examiner*—William R. Dixon, Jr.
*Assistant Examiner*—Anthony J. Green
*Attorney, Agent, or Firm*—Dority & Manning

[57] ABSTRACT

Special C-shaped carbon fibers, melt spun from mesophase pitch, were used as micro-molds to form nested dual fibers and ceramic fibers. By wetting these carbon fibers in a wet chemical precursor, and subsequently heat treating, ceramic fibers of various compositions were formed. Also, through proper control, carbon-ceramic nested fibers were produced. The ceramic materials were silica, alumina, silicon carbide, hydroxyapatite, and zirconia. The ceramic fibers could be formed with non-circular transverse cross-sectional perimeters.

10 Claims, 11 Drawing Sheets

(1) PREPARE SILICA SOL
  (TEOS-ETHANOL-H₂O-HCl)
  REACT TO DESIRED EXTENT
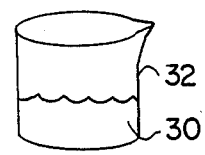
(2) SUBMERGE SPECIAL
  C-SHAPED CARBON
  FIBERS
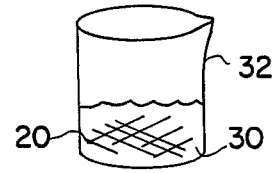
(3) PASS THROUGH FILTER
  OR SCREEN
(4) ALLOW FIBERS TO DRY
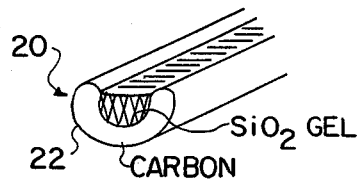
(5) HEAT IN A) AIR
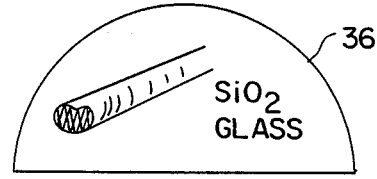
OR
B) NON OXIDIZING
  ATM. (I.E. N₂)
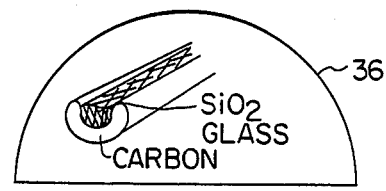
FIG. 1  THE PIGGYBACK PROCESS Bar=40um

FIG. 8
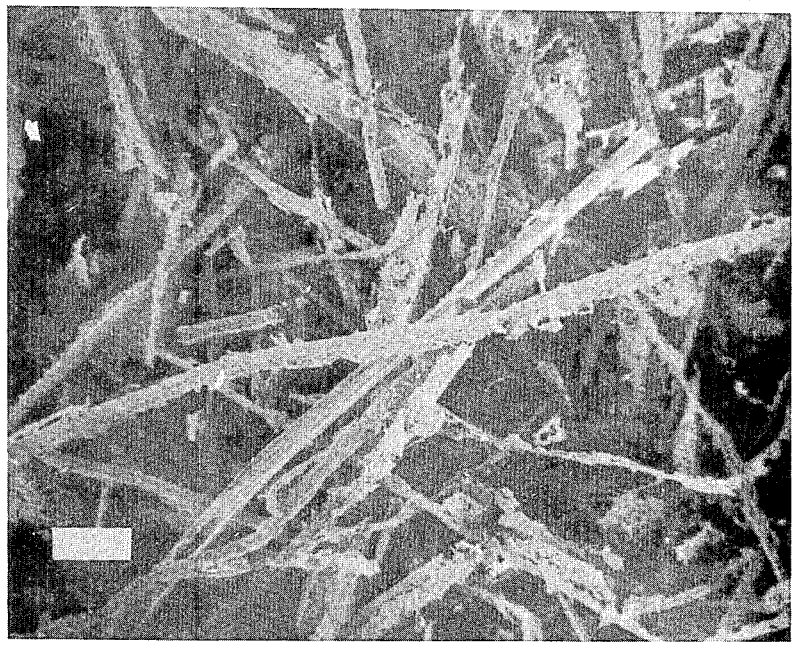
Bar=200um    FIG. 10
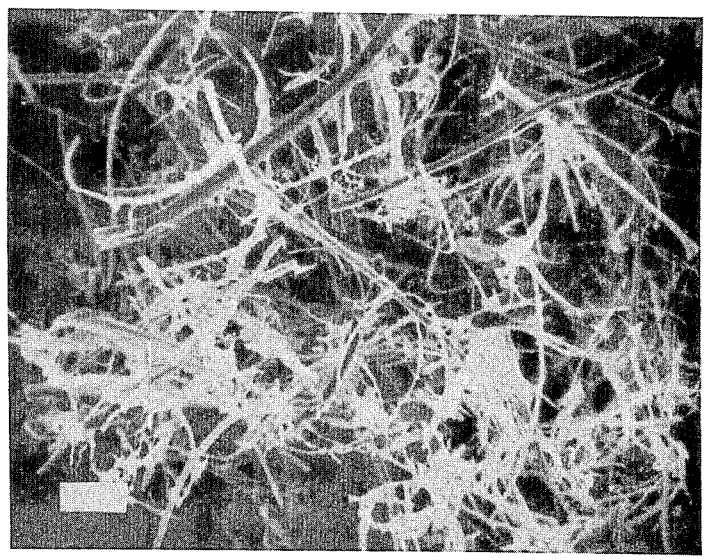
750°C, Bar=25um

600°C, Bar=100um

1600°C, Bar=100um

600°C, Bar=100um

1600°C, Bar=200um

Bar=200um

Bar=300um

50X

Hydroxyapatite Fibers Made by Piggyback Process
Used: fine hydroxyapatite particulate suspension

Strong Dual Fiber

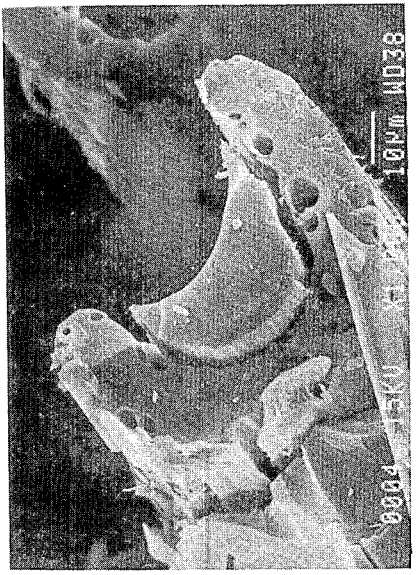
FIG. 15(a) 4.8cps  VISCOSITY EFFECTS  FIG. 15(b) 5.8cps
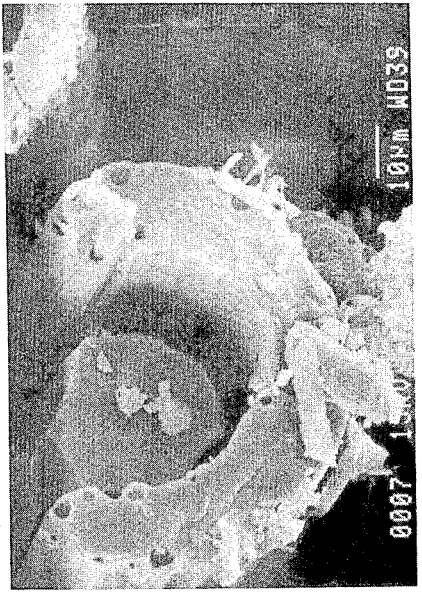
FIG. 15(c) 15.0cps
FIG. 15(d) 58.5cps
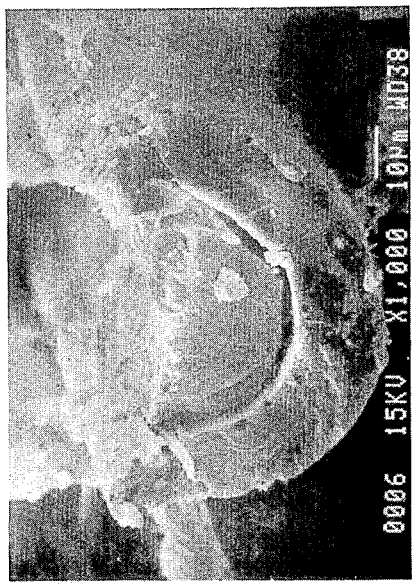

Bar=200um

Trilobal Nylon, Bar=20um

PIGGY BACK METHOD FOR PRODUCING CERAMIC FIBERS AND NON-CIRCULAR CERAMIC FIBERS IN PARTICULAR

BACKGROUND OF THE INVENTION

The present invention relates to nested ceramic fibers, non-circular ceramic fibers, and a piggyback micro-mold method for producing both kinds of ceramic fibers as well as circular ceramic fibers.

It is desirable to provide ceramic material in a fiber form so that the ceramic fibers can be suspended in a binder and more easily processed to form a ceramic/binder composite material. However, the production of ceramic fibers has been expensive. Ceramic refractory fibers of alumina-silica, alumina and zirconia can be produced by a blowing method which calls for shattering a stream of molten ceramic with a jet of air or steam. Production of ceramic fibers by this method has the disadvantage of requiring large amounts of capital investment in process and control machinery. Other methods which have been used to produce ceramic fibers include spinning methods, continuous filament methods, colloidal evaporation processes, vapor deposition single-crystal method, whisker method, oxidation method, crystallization method and pseudomorphic alteration method.

Many ceramic materials that would be desirable in the form of fibers are not spinnable. Most ceramic fibers presently made are limited by the process of drawing the fibers from a melt and rapidly cooling to prevent devitrification or crystallization. Phase separation can also be a problem. This is particularly true in the case of glass fibers. Ceramic fibers produced by melt drawing are further limited to compositions containing appreciable amounts of so-called "glass forming oxides" such as $SiO_2$, $B_2O_5$, or $P_2O_5$. Melt drawing requires high temperatures and special equipment for the drawing of the fibers.

Synthesis of single or multicomponent oxides via a sol-gel process has been possible since at least 1969 when Dislich and Hinz developed a chemical basis for the preparation of multicomponent oxides. The formation of glasses and ceramics via the sol-gel process results in very homogeneous, high purity materials from the mixing that occurs on the molecular scale. The glasses can be formed using the sol-gel process using relatively low temperatures. The absence of phase separation and crystallization during sol-gel processing allows it to be used to produce glasses and ceramics from compositions that would exhibit phase separation and crystallization during conventional melting processes.

However, sol-gel processing does pose a number of difficulties. For example, one drawback to sol-gel processing is the difficulty is forming large monolithic pieces. Many compositions formed via the sol-gel process are limited to powders or thin films.

Thus, the formation of fibers by spinning or drawing from a sol is expensive and difficult depending on the material to be spun or drawn.

Composite materials including graphite fibers in a matrix can be formed, and composite materials can be formed with ceramic fibers in a matrix as in U.S. Pat. No. 4,454,190. However, ceramic materials are difficult to work with because of their amorphous properties prior to sintering and their brittle properties after sintering. Moreover, the production of a fiber having a ceramic portion and a non-ceramic portion is not known.

OBJECTS AND SUMMARY OF THE INVENTION

A principal object of the present invention is to provide a dual fiber composed of ceramic material nested in another material.

It also is a principal object of the present invention to provide a method of producing a dual fiber having a ceramic portion nested within a portion formed of another material.

Another principal object of the present invention is to provide a method of producing a ceramic fiber that requires less capital investment in processing and control apparatus than conventional methods.

Still another object of the present invention is to provide ceramic fibers having non-circular transverse cross-sectional perimeters.

Yet another object of the present invention is to provide a method of producing a ceramic fiber having a non-circular transverse cross-sectional perimeter.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed in the appended claims.

To achieve the objects and in accordance with the purpose of the invention, as embodied and broadly described herein, a piggyback method of forming an elongated dual fiber having an elongated ceramic portion and an elongated non-ceramic portion of starting with a wet chemical precursor and a non-ceramic fiber having an elongated cavity therein, comprises: wetting the non-ceramic fiber in the wet chemical precursor; setting the wet chemical precursor portion of the wetted non-ceramic fiber; placing the wetted non-ceramic fiber into an oxygen-free environment; heating the set wetted non-ceramic fiber in the oxygen-free environment to a temperature sufficient to sinter or pyrolyze the chemical precursor portion into a ceramic portion.

Preferably the non-ceramic fiber is formed of one of the following materials: any carbon such as pitch, mesophase carbon, polyacrylinitrile (hereafter PAN), or any polymer such as polyethylene, polyvinyl alcohol, nylon, and the like. Preferably, the elongated non-ceramic carrier fiber portion has an elongated cavity with either a C-shape or an annulus shape to its transverse cross-sectional perimeter.

In further accordance with the objects and purpose of the invention, a dual fiber comprises an elongated non-ceramic carrier fiber portion having a non-circular transverse cross-sectional perimeter over a substantial length thereof and defining a cavity therein; and an elongated ceramic filler portion nesting in the cavity.

In further accordance with the objects and purpose of the invention, as embodied and broadly described herein, the piggyback method of forming a dual fiber can be transformed into a piggyback micro-mold method of forming a ceramic fiber by adding the step of removing the non-ceramic fiber portion of the dual fiber to yield a ceramic fiber. Preferably, the step of removing the non-ceramic fiber portion of the dual fiber is carried out either by heating the dual ceramic/non-ceramic fiber in an oxygen-containing environment until the non-ceramic fiber portion is burned away or by mechanically stripping away the non-ceramic fiber portion until only the ceramic portion remains.

In still further accordance with the objects and purpose of the invention, as embodied and broadly described herein, an elongated ceramic fiber has a non-circular transverse cross-sectional perimeter over a substantial length thereof.

The accompanying drawings, which are incorporated herein and constitute a part of this specification, illustrate embodiments of the invention and, together with the description, serve to explain the principles of the invention.

BRIEF DESCRIPTION OF THE DRAWINGS

FIG. 1 is a schematic of the piggyback micro-mold method of the present invention;

FIG. 8 is a SEM photograph of a ceramic fiber product of the present invention produced according to one of the methods of Example 3;

FIG. 10 is a SEM photograph of a ceramic fiber product of the present invention produced according to yet another of the methods of Example 3;

FIG. 15 is an illustration of the effect of viscosity of the wet chemical precursor on the shape of the nested ceramic portion of the dual fiber of the present invention;

DESCRIPTION OF THE PREFERRED EMBODIMENTS

Reference will now be made in detail to the present preferred embodiments of the invention, examples of which are illustrated in the accompanying drawings and described in specific examples hereinafter set forth.

In accordance with the present invention, a piggyback micro-mold method is provided for forming a dual fiber having a substantial ceramic portion. The method of the present invention requires as starting materials, a wet chemical precursor, such as a sol-gel, and an elongated non-ceramic fiber having a non-circular transverse cross-sectional perimeter over a substantial portion of the length thereof. Preferably, the transverse cross-sectional perimeter of the non-ceramic fiber defines an elongated cavity therein. These non-circular non-ceramic fibers act as micro-molds for a wet chemical precursor that is prepared from materials that would be desirable in the form of ceramic fibers. The materials constituting a part of the wet chemical precursor are not necessarily spinnable or easily formed into fibers by conventional methods.

Figure 2:
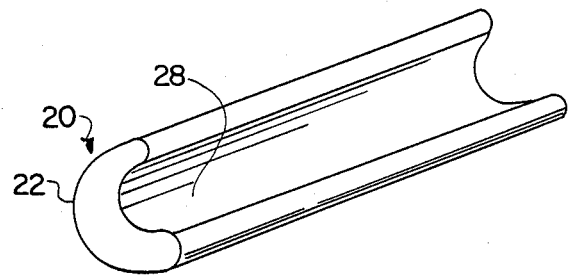
FIG. 2 is a schematic of an embodiment of a non-ceramic fiber having an elongated cavity therein.
Figure 3:
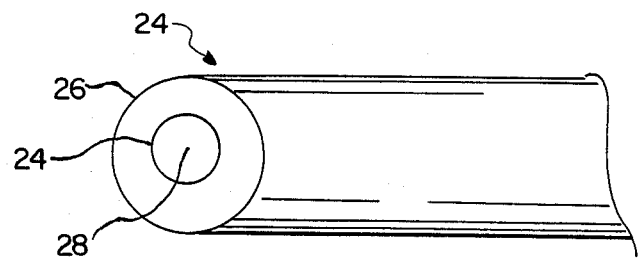
FIG. 3 is a schematic of another embodiment of a non-ceramic fiber having an elongated cavity therein.

In accordance with the method of the present invention, an elongated non-ceramic fiber is provided having a non-circular transverse cross-sectional perimeter over a substantial portion of the length thereof. As embodied herein and shown for example in FIGS. 1 and 2, a carrier micro-mold fiber 20 has a C-shaped transverse cross-sectional perimeter 22. As shown in FIG. 3, a carrier micro-mold fiber 24 has an annulus-shaped transverse cross-sectional perimeter 26. Fibers 20, 24 constitute suitable non-ceramic carrier fibers comprising components of the starting materials of the method of the present invention. Because of the non-circular transverse cross-sectional perimeters of the fibers used as micro-molds in the method of the present invention, an elongated cavity 28 is provided in the micro-mold carrier fibers.

Preferably, the non-ceramic carrier micro-mold fiber is formed from carbon or an organic polymer. The carbon can be in the form of pitch, meosphase or polyacrylinitrile. The organic polymer can be polyethylene, polyvinyl alcohol, nylon, or the like. Preferably, the polymeric micro-mold carrier fibers are cross-linked. Carbon or graphite carrier micro-mold fibers having a C-shaped or annulus-shaped profile can be obtained using the method set forth in co-pending U.S. patent application Ser. No. 820,734, filed on Jan. 21, 1986, which is hereby incorporated herein by reference and as to which, applicant is a co-inventor. According to this method, the carbon micro-mold fibers are preferably rendered infusible. Polyethylene, nylon, and polyacrylinitrile carrier micro-mold fibers can be obtained using conventional spinning procedures for commercial polymers.

Cavity 28 is available for receiving a wet chemical precursor which can be heat treated to form ceramic material. Examples of wet chemical precursors include: sol-gels, slurries, melts, suspensions and dispersions. Examples of ceramic materials used to form the wet chemical precursors which constituted one component of the starting material for the method of the present invention are: silica, alumina, silicon carbide, zirconia and hydroxyapatite.

A sol is a suspension of fine solid particles in a liquid. A sol is usually the first stage in the formation of a gel, which is a two-phase colloidal mixture of a liquid and a solid. A slurry defines coarse particulate matter combined with a liquid. A melt is the liquid phase of a substance. Suspensions and dispersions are used interchangeably to define particulate matter on the order of between 1 micron ($10^{-3}$ mm.) to one millimicron ($10^{-6}$ mm.) in size suspended in a liquid.

In one particular sol-gel formation technique, an organosilicate such as tetraethyl orthosilicate (TEOS) is mixed with a solvent, ethyl alcohol, for example. $H_2O$ is then added to cause hydrolysis of the Si—OR (R=$C_2H_5$) groups to form Si—OH. A continuous Si—O—Si network can then form through polymerization.

Hydrolysis can occur in the following ways:

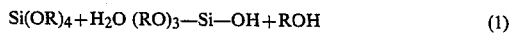

$$Si(OR)_4 + H_2O \rightarrow (RO)_3-Si-OH + ROH \quad (1)$$

$$Si(OR)_4 + 2H_2O \rightarrow (RO)_2-Si-(OH)_2 + 2ROH \quad (2)$$

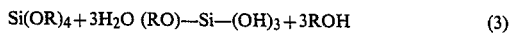

$$Si(OR)_4 + 3H_2O \rightarrow (RO)-Si-(OH)_3 + 3ROH \quad (3)$$

$$Si(OR)_4 + 4H_2O \rightarrow Si-(OH)_4 + 4ROH \quad (4)$$

Equation 4 shows a fully hydrolyzed system, in which all four (OR) groups are replaced by (OH) groups. This process consumes $H_2O$, requiring four moles of $H_2O$ for every mole of TEOS. However, in the polymerization step the Si—OH can react to form bridging oxygens between silicate molecules, releasing $H_2O$ as shown in equation (5):

$$2Si-OH \rightarrow Si-O-Si + H_2O \quad (5)$$

The $H_2O$ that is condensed during polymerization can then cause further hydrolysis, allowing complete hydrolysis with less than four moles of $H_2O$ for every mole of TEOS.

As polymerization continues, a silicate network is formed with increasingly large molecules. At some point, the Si—O—Si linkage between particles together to form a rigid, porous, tangled network of branching chains.

Hydrolysis and condensation reactions are critical steps, since they determine whether the subsequent processing steps to form the sol-gel will be successful. Both hydrolysis and condensation are affected by the following factors: the $H_2O$ to TEOS molar ratio, the solvent to TEOS ratio, temperature, pH, atmosphere, mixing speed, and time.

Hydrolysis and condensation rates of a sol-gel can be increased by addition of acid or base as a catalytic agent. In acid catalyzed systems (pH less than two), hydrolysis is rapid, but gelation is slow. This is due to a small amount of linkage between particles, which is a result of the small ionic charge of the particles. The ionic charge of the particles, which increases as pH increases, is needed to facilitate particle-particle collisions. The result is a tendency towards chains rather than a three dimensional network.

In base catalyzed systems (pH greater than two) the highly charged polymers react with monomers and rapidly decrease the concentration of monomers. This causes growth of individual spherical polymeric species. The high surface charge on the spherical particles causes mutual repulsion, therefore there is little particle-particle reaction, which leads to a precipitate rather than a gel at very high pH.

In a mixed catalyst system, acid is added initially, followed by adding base at a later time. By using this method, gelation can occur faster and at lower water contents than by using only acid or only base. This is because under basic conditions, $SiO_2$ is more soluble than in acid, which facilitates partial depolymerization. Since hydroxide ions attack Si—O—Si bonds, the hydrolysis rate is comparable to the condensation rate. The increase in the hydrolysis rate leads to dense particles with weak particle-particle bonding.

In accordance with the method of the present invention, there is provided the step of wetting the non-ceramic fiber in a wet chemical precursor. As embodied herein and shown for example in FIG. 1, the step of wetting the non-ceramic fiber in the wet chemical precursor preferably comprises submerging non-ceramic fibers 20 beneath the surface of a wet chemical precursor 30 held in a bath 32. This step also can be accomplished by dipping, bathing, spraying, or the like.

In further accordance with the method of the present invention, the wet chemical precursor is allowed to set until it nests in the cavity of the non-ceramic fiber. For example, the non-ceramic fiber is removed from the wet chemical precursor bath. As shown in FIG. 1, this can be accomplished by draining the liquid through a screen 34 to filter the non-ceramic fibers. As the non-ceramic fibers are removed from the wet chemical precursor bath, surface tension causes the wet chemical precursor to adhere to the non-ceramic fiber. Thus, the non-ceramic fiber micro-mold carries with it a substantial amount of the wet chemical precursor in the elongated cavity of the non-ceramic fiber. A short time (on the order of five minutes at room temperatures and pressure) after removal from the wet chemical precursor bath, the wet chemical precursor in the cavity has set sufficiently to nest in the cavity of the non-ceramic fiber. This is shown for example in FIG. 4, for a non-ceramic fiber composed of carbon and a silica wet chemical precursor.

As stated above, a metal oxide sol-gel is a suitable wet chemical precursor for the method of the present invention. One of the factors that affects setting, i.e., gelling, time of a sol-gel is the $H_2O$ content. For example, as the $H_2O$ to TEOS molar ratio increases, the gelling time will decrease because of the increase in the number of reactants. The humidity of the atmosphere above a solution can affect the water content. Because the gelling time is sensitive to water content, the gelling time could be affected by the atmosphere.

Figure 18:
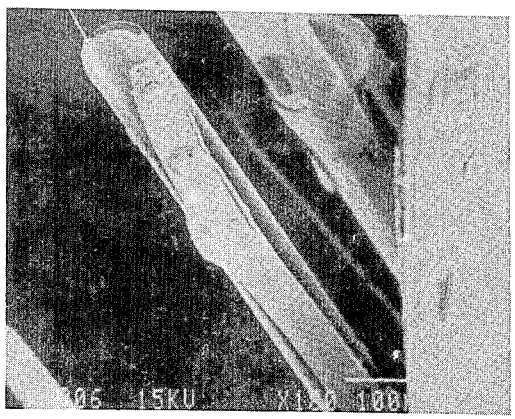
FIG. 18 is a SEM photograph of a dual fiber of the present invention having a silica ceramic nested portion and a C-shaped non-ceramic micro-mold portion.

In further accordance with the present invention, the non-ceramic fiber with the wet chemical precursor set and nested in the cavity of the fiber, is placed in an oxygen-free environment and heated to a temperature sufficient to pyrolyze or sinter the chemical precursor portion into a ceramic portion. The actual temperature depends on the composition of the chemical precursor portion, the preparation technique for the chemical precursor and the sintering desired. The sintering temperature cannot be so high as to burn away the non-ceramic fiber portion, unless removal of this portion is desired. As embodied herein and shown for example in FIG. 1, the oxygen-free environment is provided by filling a heating chamber 36 with a non-oxidizing gas such as inert gases like argon, helium or nitrogen. The temperature inside the heating chamber is then raised in step-wise fashion over time at a rate of about 20° C. per minute to a temperature of at least 600° C. for a period of 20 to 30 minutes, or a longer or shorter time as necessary to pyrolyze or sinter the chemical precursor portion into a continuous ceramic portion nested in the cavity of the non-ceramic fiber portion. In this way, a dual fiber is produced. As shown for example in FIG. 18, the dual fiber has a ceramic fiber portion nested in the C-shaped carbon fiber micro-mold portion. The line in the lower right hand corner of FIG. 18 represents a length of 100 microns.

In further accordance with the method of the present invention, an additional processing step is provided to remove the non-ceramic fiber portion of the non-ceramic/ceramic dual fiber in order to yield a ceramic fiber. This ceramic fiber may have a circular or non-circular transverse cross-sectional perimeter, depending on the shape of the cavity of the micro-mold carrier fiber. As embodied herein and shown for example in FIG. 1, the step of removing the non-ceramic fiber portion preferably comprises heating the dual fiber in an oxygen-containing environment until the non-ceramic fiber portion is burned away and only the ceramic portion remains. Preferably, this is accomplished by evacuating the non-oxydizing gas from the heating chamber and substituting into the heating chamber an atmosphere of air. Then the temperature within the heating chamber is raised to a temperature sufficient to burn away the non-ceramic portion of the dual fiber. For carbon micro-mold carrier portions, a temperature of approximately 1100° C. has been used for a period of time which is sufficient to burn away the non-ceramic micro-mold fiber portion of the dual fiber. However, for carbon micro-mold carriers, a temperature of approximately as low as 600° C. can be used to burn away the non-ceramic micro-mold fiber portion of the dual fiber.

In an alternative embodiment of the invention, a non-ceramic micro-mold fiber portion is mechanically removed until only the ceramic portion remains. This can be accomplished by using a separating agent or employing a shaking technique in the presence of an abrasive agent or instrumentality.

In another alternative embodiment of the method of the present invention, the step of heating the non-ceramic fiber portion having the set wet precursor nested in the cavity can be eliminated, and the method can proceed directly to the step of removing the non-ceramic fiber portion by firing same in an air atmosphere. For some set chemical precursors, the firing in an air atmosphere is sufficient to pyrolyze or sinter the set chemical precursor into a continuous ceramic portion. The omission of the step of heating in a non-oxidizing environment can be used when the object of the method is to produce a ceramic fiber rather than a dual fiber having a ceramic portion nested in a non-ceramic portion. This is because the firing in an air atmosphere oxydizes the non-ceramic fiber portion and thus removes same.

The materials chosen to demonstrate the effectiveness of the piggyback process as a means of forming ceramic fibers were: $SiO_2$, $Al_2O_3$, $ZrO_2$, SiC, and Hydroxyapatite.

EXAMPLE 1

A silica sol was prepared using tetraethyl orthosilicate (hereafter TEOS), which can be obtained from Fisher Scientific Co., P.O. Box 829, Norcross, Ga. 30091. The silica sol was prepared by adding anhydrous ethyl alcohol to TEOS in the ratio of three moles of alcohol to each mole of TEOS. The solution was mixed for 15 minutes before adding hydrochloric acid at a concentration that allowed the molecular ratio of water to TEOS to be 6.0 : 1.0 and the concentration of HCl to TEOS to be 0.01 : 1.0. The HCl solution was added dropwise over a period of 25 minutes. The sol was then covered and mixing continued for two hours. The water to TEOS molar ratio of the above sol was 6.0 : 1.0, corresponding to a solution that does not exhibit spinnability.

Carbon fibers having a C-shaped transverse cross-sectional perimeter were prepared as described in U.S. application Ser. No. 820,734, filed on Jan. 21, 1986, which is hereby incorporated herein by reference. Applicant is a co-inventor of Ser. No. 820,734.

The C-shaped carbon fibers were submerged into the sol and removed from the sol before the sol reached the gelling point. No strict guidelines applied to the time at which the carbon fibers were dipped in the sol, except that it had to be after the final acid addition, and before gelling. The viscosity of the solution increases slowly with time as polymerization takes place. When the viscosity approaches 1 Pa Sec, it becomes difficult to separate the fibers from the sol and the fibers also tend to clump together.

Figure 4:
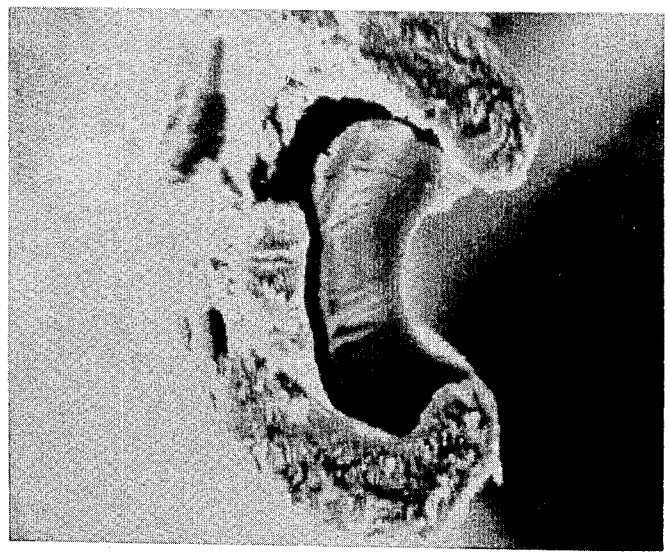
FIG. 4 is a SEM photograph at 2000 times magnification showing the result of performing one of the steps of the method of the present invention.

The dipped fibers were set by allowing them to dry in atmospheric pressure at room temperature. The set fibers were examined under a light microscope to reveal that the cavity of the "C" was filled with silica gel. A scanning electron microscope (hereafter SEM) photograph showing the gel nested within the C-shaped cavity is shown in FIG. 4 at a magnification of 2000 times actual size. The set fiber is heated from room temperature to 800° C. at a rate of 20° C. per minute to simultaneously burn off the carbon carrier fiber portion and complete the gel-to-glass transformation. Pure, transparent, amorphous silica fibers were the result and are shown in a SEM photograph in FIG. 5 at a magnification of 200 times. The tensile strength of these fibers was in excess of 150,000 psi. An individual silica fiber is shown in an SEM photograph in FIG. 6 at a magnification of 800 times. Note that the ceramic fiber shown in FIG. 6 has a non-circular transverse cross-sectional perimeter which is shaped like a crescent moon.

Other silica sols were prepared with varying amounts of water, alcohol, and acid. Acid-base catalyzed systems were also used.

EXAMPLE 2

Figure 7:
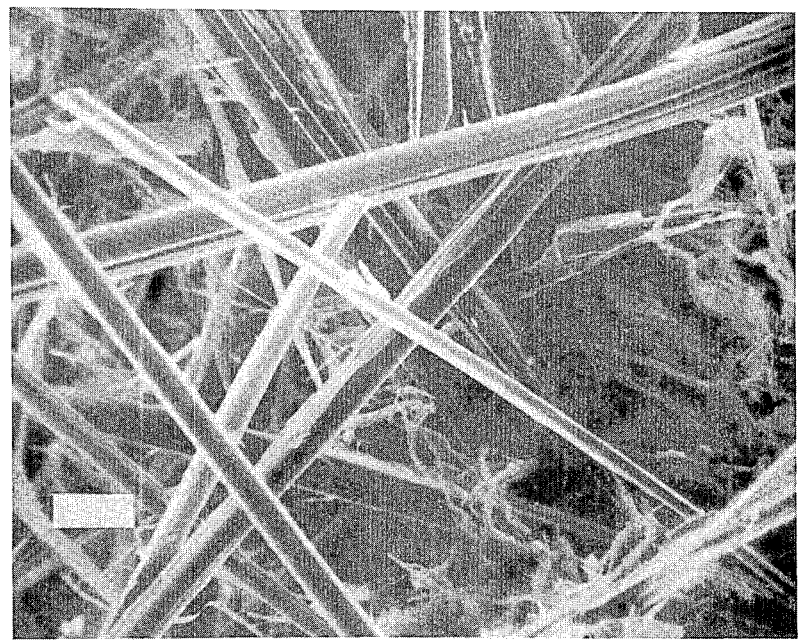
FIG. 7 is a SEM photograph at 240 times magnification of a ceramic fiber product of the present invention produced according to the method of Example 2.

Aluminum-isopropoxide, $Al(OC_3H_7)_3$, supplied by Alfa Products, Inc., 152 Andover Street, Danvers, Mass. 01923, was used as the starting material for preparing an alumina sol. Twenty (20) grams of Aluminum isopropoxide was added to 180 ml of deionized water which had been placed in a 250 ml beaker and heated to maintain the water temperature between 80° C. and 90° C. The beaker was only partially covered, allowing evaporation of water and alcohol from the sol. The resulting slurry was mixed vigorously for 25 minutes before 5.8 ml of 1.2m HCl was added to achieve a 0.07 : 1.0 acid to alkoxide molar ratio. During the HCl addition, mixing was continued and the temperature maintained at 80° C. Mixing and temperature maintenance continued for four hours in a covered container. When the volume of the sol was approximately one-third ($\frac{1}{3}$) that of the starting volume (approximately 4 hours later), C-shaped carbon fibers were submerged in the sol for about 5 minutes. As shown in FIG. 1, the fibers were removed by filtering or screening and allowed to dry in air at room temperature and pressure. The fibers were heated in an air atmosphere to 600° C. at 20° C. per minute and maintained in this 600° C. environment for about 30 minutes to assure complete oxidation of the carbon fiber micro-molds. Six hundred degrees (600° C.) was sufficient to burn off the carbon micro-molds and form transparent alumina fibers, which are shown in FIG. 7 in a SEM photograph at 240 times actual size.

EXAMPLE 3

Several different methods were used to form zirconia fibers via the piggyback process. These can be separated according to the three different starting materials: Zirconyl Hydroxycloride Trihydrate, supplied by Harshaw Chemical Company, Zirconium Acetate Solution, supplied by Harshaw, and Zirconium n-Butoxide Butanol Complex, supplied by Alfa Products, Inc.

Where zirconium n-butoxide butanol complex was the starting method, a precipitate was formed by a process described in Grassi, John Anthony, "Characterization of Parameters Affecting the Properties of an Alkoxid-Derived Zirconia Sol-Gel," Graduate School of Clemson University, Masters' Thesis, Clemson, S.C., August 1985, which is hereby incorporated herein by reference. The precipitate was dried and calcined to 1000° C. Calcium carbonate, $CaCO_3$, and magnesium carbonate, $MgCO_3$, additions were made to get 12 mol % CaO and 0.1 mol % MgO in the final product. The $CaCO_3$ was in the form of whiting. The $MgCO_3$ was a precipitate. Both passed easily through 400 mesh. The powders were milled in a plastic jar using alumina grinding media. A slurry was made by adding water to the powder in a one to one volume ratio. Algin was added as a stabilizing agent.

Figure 9A:
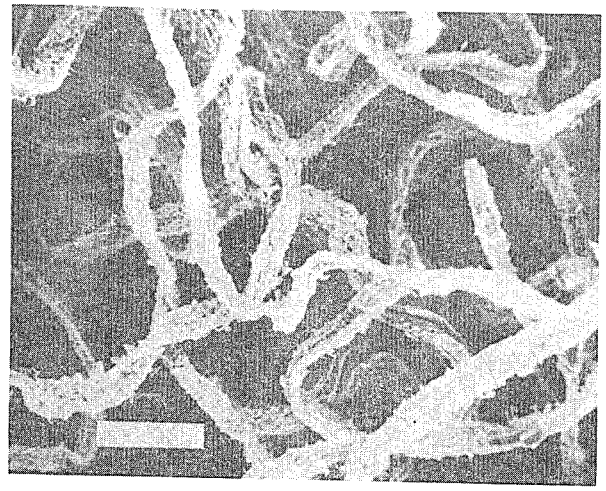
FIGS. 9a and 9b are SEM photographs of ceramic fiber products of the present invention produced according to another of the methods of Example 3.
Figure 9B:
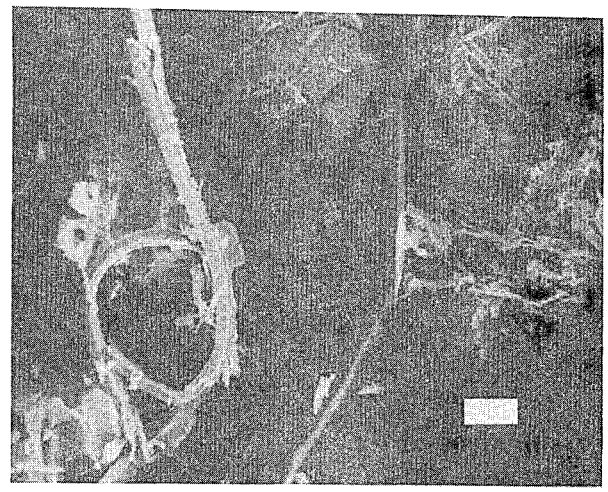
Figure 11A:
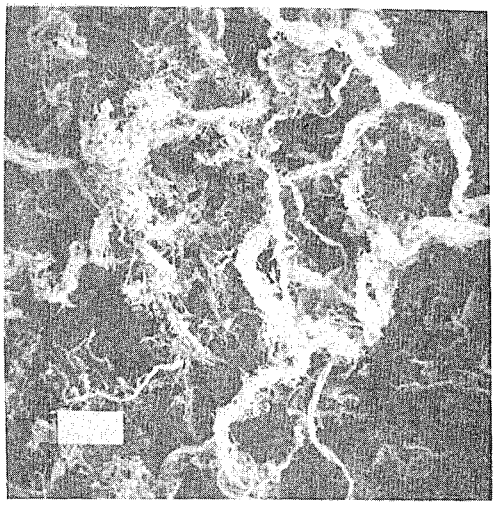
FIGS. 11a and 11b are SEM photographs of ceramic fiber products of the present invention produced according to still another of the methods of Example 3.
Figure 11B:
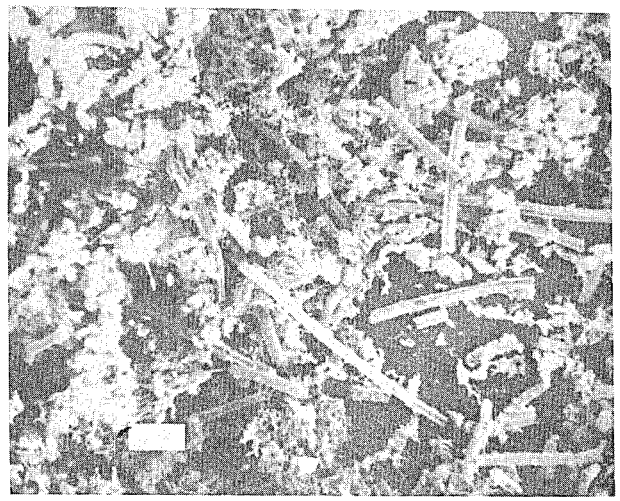

After the suspension was formed, C-shaped carbon fibers were submerged, removed, dried and fired. The firing was done in two ways. In the first way, the dipped fibers were first fired to 1450° C. in a non-oxidizing atmosphere, then oxidized to burn off the carbon fiber. In the second way, the fibers were fired in air to 1600° C. X-ray diffraction was used to determine that the final material was a zirconia fiber in crystal form. There were fibers in the tetragonal phase and some in the monoclinic phase. Zirconia fibers fired in the first way are shown in FIG. 8 in a SEM photograph. The rectangular bar in the lower left corner of FIG. 8 represents a length of 200 microns for purposes of indicating the fiber dimensions. Zirconia fibers fired in the second way are shown in FIG. 9 in a SEM photograph. In FIG. 9a, the firing temperature was 600° C., and in FIG. 9b the firing temperature was 1600° C. The rectangular bars in the lower corners of FIGS. 9a and 9b represent a length of 100 microns for purposes of indicating the fiber dimensions.

Where zirconium acetate was used as the starting material for zirconia, a 25% zirconium acetate solution supplied by Harshaw Chemical Company was used. Either calcium oxide or yttria was employed as the stabilizing agent. Where calcium oxide was the stabilizing agent, 12 mol % equivalent CaO was added by dissolving the correct amount of calcium acetate $(Ca(C_2H_3O_2)_2 \cdot H_2O)$ in the zirconium acetate solution. 0.1 mol % MgO was also included with the CaO as a sintering agent. The MgO was also added to the zirconium acetate solution in the acetate form $(Mg(C_2H_3O_2)_2 \cdot 4H_2O)$. Where yttria was the stabilizer, 10 mol % equivalent $Y_2O_3$ was dissolved into the zirconium acetate solution in the form of yttrium acetate $(Y(C_2H_3O_2)_3 \cdot xH_2O, X=2)$. After the acetate solutions were prepared, C-shaped carbon fibers were submerged in them, removed, dried, and fired to a temperature as low as 750° C. to form zirconia. X-ray diffraction was used to characterize the fired material as zirconia in the tetrogonal and monoclinic phases. Zirconia fibers produced from the acetate are shown in FIG. 10 in a SEM photograph in which the rectangular bar in the lower left corner represents a length of 25 microns for purposes of indicating the fiber dimensions.

Where zirconyl hydroxycloride trihydrate from Harshaw Chemical was the precursor for zirconia, C-shaped carbon fibers were simply submerged in the as-received liquid, removed, dried and fired in air. FIG. 11a shows fibers fired to 600° C. in air, and FIG. 11b shows these fibers fired to 1600° C. in air. In FIG. 11a, the rectangular bar represents a length of 100 microns, and in FIG. 11b the bar represents a length of 200 microns. Zirconia fibers made from this trihydrate precursor appear to be made up of smaller fiber-like particles at 600° C. whereas at 1600° C. they appear to be more dense an are accompanied by larger non-fiberous particles. This starting material for the precursor is incapable of being drawn into a fiber or spun into a fiber through a spinerette.

EXAMPLE 4

Figure 12:
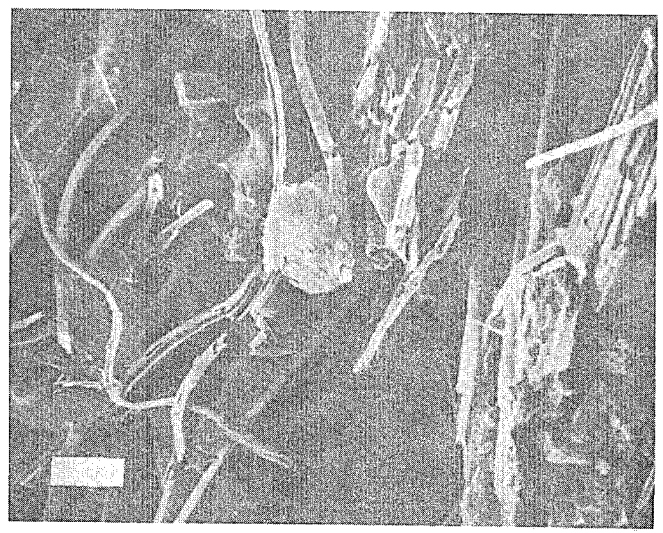
FIG. 12 is a SEM photograph of a ceramic fiber product of the present invention produced according to one of the methods of Example 4.

A dilute HCl solution was added to furfuryl alcohol and mixed well. TEOS was added to the solution of alcohol and HCl. The TEOS: furfuryl alcohol volume ratio was 1:1. The $H_2O$ : TEOS molar ratio was 2:1, and the HCL: TEOS molar ratio was 0.01 : 1.0. This solution was mixed for one day before C-shaped carbon fibers were submerged, removed, dried and fired to 1450° C. in an argon atmosphere. After firing in argon, the fibers were oxidized to 600° C. to remove the carbon fibers and any excess carbon. The resulting fiber material was characterized by x-ray diffraction as ceramic material such as beta-SiC. These fibers are shown in FIG. 12 in a SEM photograph in which the rectangular bar in the lower left corner represents a length of 200 microns for purposes of indicting the fiber dimensions.

Figure 13:
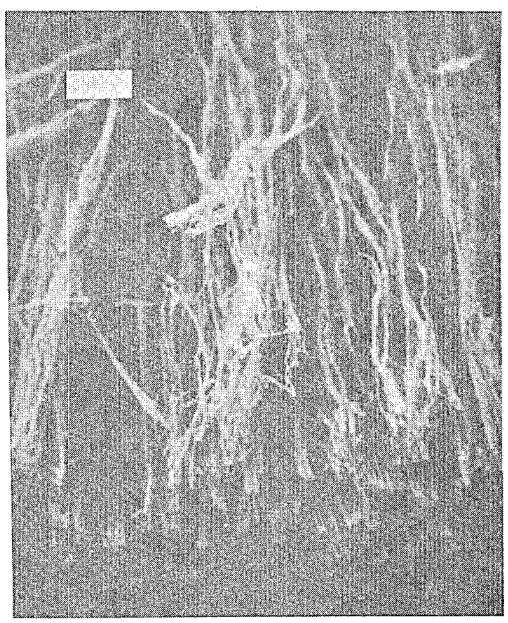
FIG. 13 is a SEM photograph of a ceramic fiber product of the present invention produced according to another of the methods of Example 4.

SiC was made from polysilastyrene (PSS). The PSS was produced by a method similar to that described in R. West et al, "Polysilastyrene: Phenylmethylsilane-Dimethylsilane Copolymers as Precursors to Silicon Carbide," *American Chemical Society Bulletin*, Vol. 62, No. 8, pp. 899-902 (1983), which is hereby incorporated herein by reference, and via the TEOSIC process ® using TEOS and Furfuryl Alcohol supplied by Fisher Scientific Co. C-shaped carbon fibers were submerged in a PSS-tolvene solution, removed, dried and pyrolyzed in an argon atmosphere at 1100° C. After pyrolysis, the fibers were oxidized in air at 800° C. for 30 minutes in order to remove the carbon fiber micromold. Fourier transform infra-red spectroscopy (hereafter FT-IR) was used to characterize the resulting fibers in terms of the bonds which were present. This determination established the final fiber product to be $SiO_2$ ceramic fiber. These silica fibers are shown in FIG. 13 in a SEM photograph in which the rectangular bar in the upper left corner represents a length of 300 microns for purposes of indicating the fiber dimensions.

EXAMPLE 5

Figure 14:
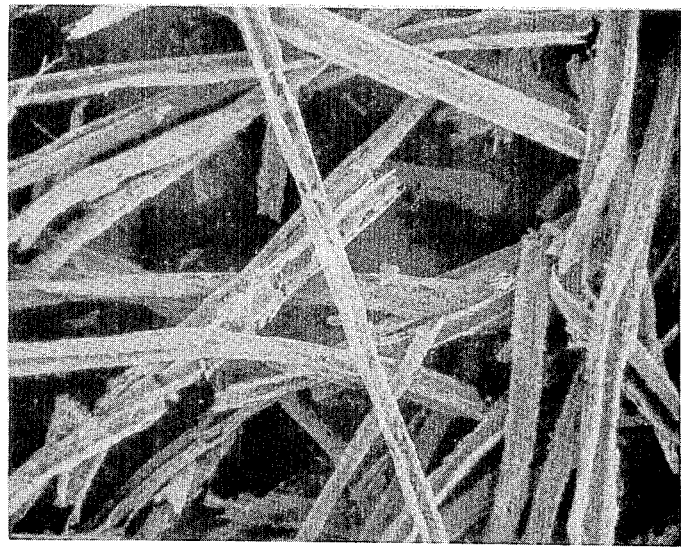
FIG. 14 is a SEM photograph at 50 times magnification of ceramic fiber products of the present invention produced according to the method of Example 5.

A hydroxyapatite slurry (HA-slurry) was supplied by Coors Biomedical Company. C-shaped carbon fibers were submerged in HA-slurry, removed and dried. Redipping and drying was repeated two more times. The triple dipped fibers were then placed in a pure nitrogen (N$_2$) atmosphere which was then heated from room temperature to 980° C. at a rate of 4° C. per minute. Then the fibers were removed from the nitrogen atmosphere and placed in an air atmosphere at room temperature. The fibers then were heated in the air atmosphere from room temperature to 600° C., at 5° C. per minute. The samples were cooled slowly by leaving them in the furnace as it cooled after both heat treatments. FIG. 14 shows a SEM photograph at 50 times magnification for hydroxyapatite ceramic fibers produced according to the method of Example 5.

EXAMPLE 6

A silica sol was prepared with a 2:1 TEOS to ethanol volume ratio, a 2:1 H$_2$O to TEOS molar ratio, and a 0.01 : 1.0 HCl to TEOS molar ratio. The sol was covered with plastic wrap and mixed at a constant rate. After three days, pin-holes were made in the cover to allow some evaporation. After four days the pin-holes were enlarged to about ⅛ inch diameter. After five days the mixing rate was increased by 25%. The viscosity was measured and C-shaped carbon fibers dipped as shown on Table V.

TABLE V

| Time | Fig. | Viscosity in Centipoise |
|---|---|---|
| 3 days | 15a | 4.8 |
| 6 days | 15b | 5.8 |
| 10 days | 15c | 15.0 |
| 12 days | 15d | 58.5 |

1 centipoise (cps) = .01 Poise

As shown in FIG. 15, as viscosity increases, the ceramic fiber portion of the dual fiber produced according to the method of the present invention acquires a transverse cross-sectional perimeter that becomes more circular. Thus, the viscosity of the chemical precursor provides some degree of control over the non-circularity of the transverse cross-sectional perimeter of the ceramic fiber portion.

Figure 16:
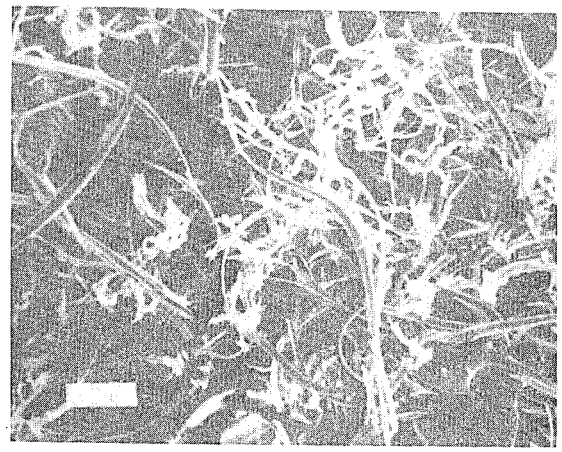
FIG. 16 is a SEM photograph of silica fiber products of the present invention produced according to the method of Example 1 with a trilobal nylon micro-mold fiber.
Figure 17:
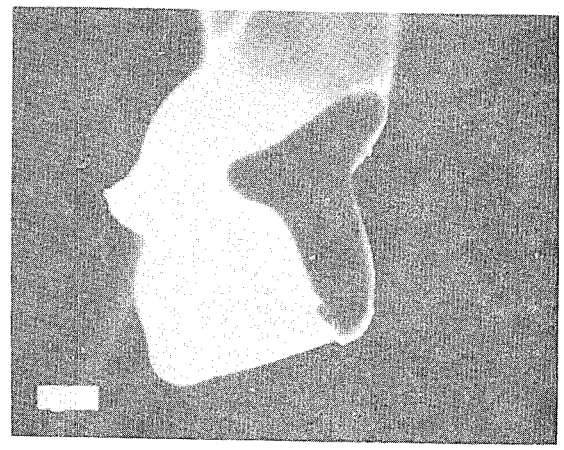
FIG. 17 is a SEM photograph at 450 times magnification of a trilobal nylon fiber micro-mold for use in the method of the present invention.

FIG. 16 shows silica ceramic fibers formed by using nylon fibers having a trilobal transverse cross-sectional perimeter for the non-ceramic micro-mold portions. The rectangle at the lower left corner of FIG. 16 represents a length of 200 microns and indicates the dimensions of the silica fibers shown therein. FIG. 17 shwns the trilobal nylon fiber acting as the micro-mold carrier fiber for the silica fibers shown in FIG. 16. The bar in the corner of FIG. 17 represents a length of 20 microns. The silica fibers shown in FIG. 16 were produced according to the method described in Example 1 above, except that the trilobal nylon fiber was used as the nonceramic carrier micro-mold fiber instead of the C-shaped carbon fiber used in Example 1.

The piggyback method makes possible many kinds of ceramic fibers not possible by other processes. Many ceramic fibers presently made are limited by the process of drawing the fibers from a melt and rapidly cooling to prevent devitrification of crystallization. Phase separation can also be a problem. This is particularly true in the case of glass fibers. Ceramic fibers produced by melt drawing are further limited to compositions containing appreciable amounts of glass forming oxides such as SiO$_2$, B$_2$O$_5$, or P$_2$O$_5$. Also, melt drawing requires high temperatures and special equipment for the drawing of the fibers. In the piggyback method of the present invention, ceramic fibers are formed in a unique way which requires neither the use of high temperature melting equipment nor glass forming oxides as a major constituent of the composition of the fiber.

Interest in ceramic-carbon dual fibers has been stimulated by their potential uses in composites. Applicant forsees that the ceramic component would act as a crack-eater, thereby toughening a composite and increasing its damage tolerance. This foresight is based in part on the fact that toughness has been related to fiber pull-out, which is related to a low fiber matrix interfacial bond. However, strength of a composite is related to a strong interfacial bond. By controlling the interfacial bond through control of the composition of the ceramic component of dual fibers, it may be possible to produce a fiber that is strongly bonded to the matrix on one side, and weakly bonded on the other.

Another potential advantage of incorporating ceramic-carbon dual fibers in a composite may be oxidation resistance. Presently the surface of carbon-carbon composites are coated with an oxidation resistant material so that the composite can be used at higher temperatures. However, a break in this coating can cause failure of the composite due to oxidation. By incorporating an oxidation resistant ceramic material in the reinforcing fibers, hence the body of the carbon-carbon composite, a sealing mechanism may occur when the ceramic material becomes less viscous at an elevated temperature. The ceramic component could be designed to melt at a given temperature through control of composition. Once fluid, the oxidation resistant ceramic material would be free to flow into pinholes and cracks, protecting against further oxidation.

Figure 5:
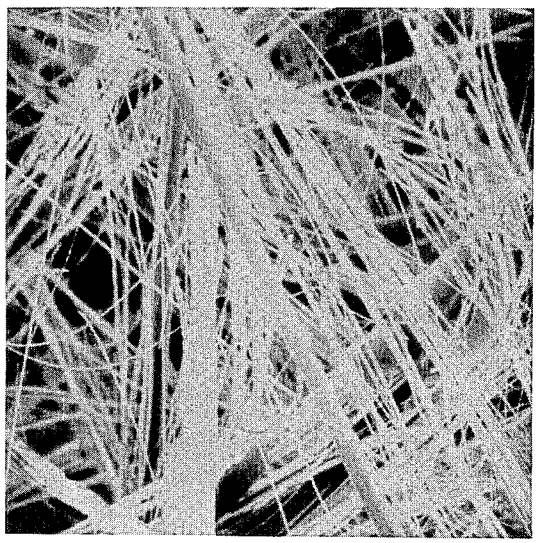
FIG. 5 is a SEM photograph at 200 times magnification showing a plurality of ceramic fiber products of the present invention.
Figure 6:
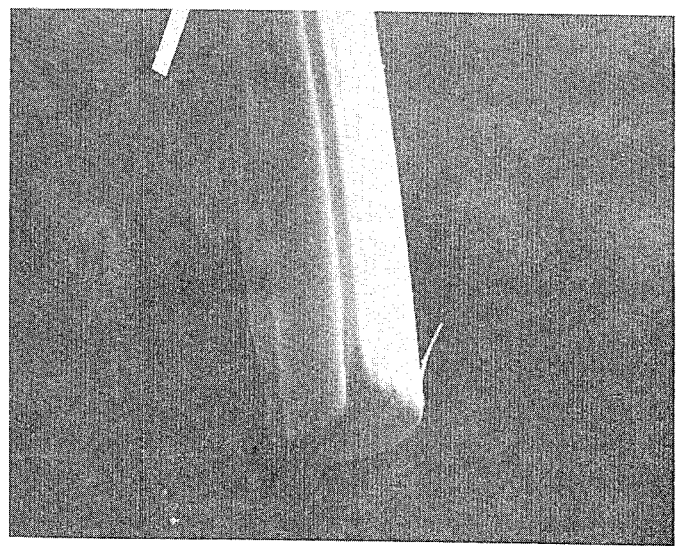
FIG. 6 is a SEM photograph at 800 times magnification showing the ceramic fiber product of the present invention having a non-circular transverse cross-sectional perimeter.

None of the conventional methods for producing ceramic fiber permit the production of ceramic fibers having a non-circular transverse cross-sectional perimeter. However, the micro-mold method of the present invention makes it possible to produce ceramic fibers having non-circular transverse cross-sectional perimeters. As shown in FIG. 5, for example, the use of C-shaped micro-mold carrier fibers yields ceramic fibers having a generally crescent moon shaped transverse cross-sectional perimeter. Similarly, the use of micro-molds having a differently shaped non-circular cavity would yield a commensurately shaped transverse cross-sectional perimeter for the ceramic fiber produced therewith.

It will be apparent to those skilled in the art that various modifications and variations can be made in the present invention without departing from the scope or the spirit of the invention. Thus, it is intended that the present invention cover the modifications and variations of this invention, provided they come within the scope of the appended claims and their equivalents.

What is claimed:

1. A piggyback method of forming a ceramic fiber from a wet chemical precursor including a metal oxide and being capable of being sintered to form ceramic material, the method consisting essentially of:

providing an elongated micro-mold carrier fiber, said carrier fiber being formed of a material other than ceramic material and to which said precursor adheres, said elongated carrier fiber defining an elongated cavity therein and over a substantial portion of the length thereof;

wetting the cavity of said carrier fiber with the wet chemical precursor;

setting the chemical precursor in the cavity of said carrier fiber until the wet chemical precursor is nested in the cavity;

placing said carrier fiber with the nested chemical precursor into an oxygen-free environment;

heating said carrier fiber with the nested chemical precursor in the oxygen free environment to a temperature sufficient to sinter the nested chemical precursor into a ceramic fiber and form a dual fiber having a ceramic fiber nested in said carrier fiber; and removing said carrier fiber of said dual fiber to yield said ceramic fiber.

2. A method as in claim 1 further including the step of cross-linking the carrier fiber before wetting same in the wet chemical precursor.

3. A method as in claim 1, wherein:
the step of removing the carrier fiber comprises mechanically removing the carrier fiber until only the ceramic fiber remains.

4. A method as in claim 1, wherein:
the carrier fiber is formed of one of the following materials: carbon, a polymeric material.

5. A method as in claim 2, wherein:
the carrier fiber is formed of one of the following materials: carbon, a polymeric material.

6. A method as in claim 1, wherein:
the wet chemical precursor constitutes one chosen from the group consisting of a sol-gel, a slurry, a melt, a suspension, and a dispersion, and includes at least one of the following ceramic materials:
silica, alumina, silicon carbide, zirconia, and hydroxyapatite.

7. A piggyback method of forming a ceramic fiber from a wet chemical precursor including a metal oxide and being capable of being sintered to form ceramic material, the method consisting essentially of:
providing an elongated micro-mold carrier fiber, said carrier fiber being formed of a material other than ceramic material and to which said precursor adheres, said elongated carrier fiber defining an elongated cavity therein and over a substantial portion of the length thereof;
wetting the cavity of said carrier fiber with the wet chemical precursor;
setting the chemical precursor in the cavity of said carrier fiber until the wet chemical precursor is nested in the cavity;
placing said carrier fiber with the nested chemical precursor into an oxygen-free environment;
heating said carrier fiber with the nested chemical precursor in the oxygen free environment to a temperature sufficient to sinter the nested chemical precursor into a ceramic fiber and form a dual fiber having a ceramic fiber nested in said carrier fiber; and
removing the carrier fiber of said dual fiber to yield said ceramic fiber by heating the dual fiber in an oxygen-containing environment until the carrier fiber is burned away and only the ceramic fiber remains.

8. A method as in claim 7, wherein:
the carrier fiber is formed of one of the following materials: carbon, a polymeric material.

9. A piggyback method of forming from a wet chemical precursor, which includes a metal oxide and is capable of being sintered to form ceramic material, a ceramic fiber having a non-circular transverse cross-sectional perimeter over a substantial portion of the length of the fiber, the method consisting essentially of the steps of:
providing an elongated micro-mold carrier fiber, said carrier fiber being made of material other than ceramic material and to which said precursor adheres, said elongated carrier fiber defining an elongated cavity therein having a non-circular transverse cross-sectional perimeter over a substantial portion of the length thereof;
wetting the cavity of said carrier fiber in the wet chemical precursor;
setting said chemical precursor in the cavity of said carrier fiber until the chemical precursor is nested in the cavity;
placing said carrier fiber with the nested chemical precursor into an oxygen-free environment;
heating said carrier fiber with the nested chemical precursor in the oxygen-free environment to a temperature sufficient to sinter the nested chemical precursor into a ceramic fiber;
removing said carrier fiber from said ceramic fiber to yield a ceramic fiber having a non-circular transverse cross-sectional perimeter over a substantial portion of the length thereof.

10. A method as in claim 9, wherein:
the wet chemical precursor constitutes one chosen from the group consisting of a sol-gel, a slurry, a melt, a suspension, and a dispersion, and includes at least one of the following ceramic materials:
silica, alumina, silicon carbide, zirconia, and hydroxyapatite.

* * * * *

UNITED STATES PATENT AND TRADEMARK OFFICE
CERTIFICATE OF CORRECTION

PATENT NO. : 4,820,664

DATED : April 11, 1989

INVENTOR(S) : Charles C. Fain

It is certified that error appears in the above-identified patent and that said Letters Patent is hereby corrected as shown below:

Column 2, line 34: Change "of" to read --by--.

Drawing Sheet 11 of 11 showing Fig. Nos. 17A, 17B, 17C, and 18 is to be replaced by the correct Drawing Sheet 11 of 11 showing Fig. Nos. 16 and 17, as shown below, and in the original formal drawings. The Patent No. for Sheet 11, should read --4,820,664--.

FIG. 16

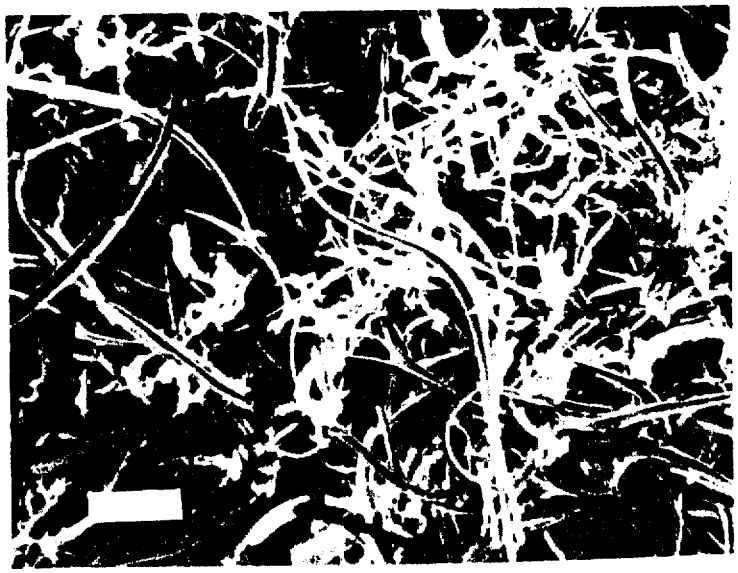

Bar=200um

UNITED STATES PATENT AND TRADEMARK OFFICE
CERTIFICATE OF CORRECTION

PATENT NO. : 4,820,664
DATED : April 11, 1989
INVENTOR(S) : Charles C. Fain

It is certified that error appears in the above-identified patent and that said Letters Patent is hereby corrected as shown below:

Trilobal Nylon, Bar=20um

FIG. 17

Signed and Sealed this

Fourteenth Day of November, 1989

*Attest:*

JEFFREY M. SAMUELS

*Attesting Officer*     *Acting Commissioner of Patents and Trademarks*